120,859

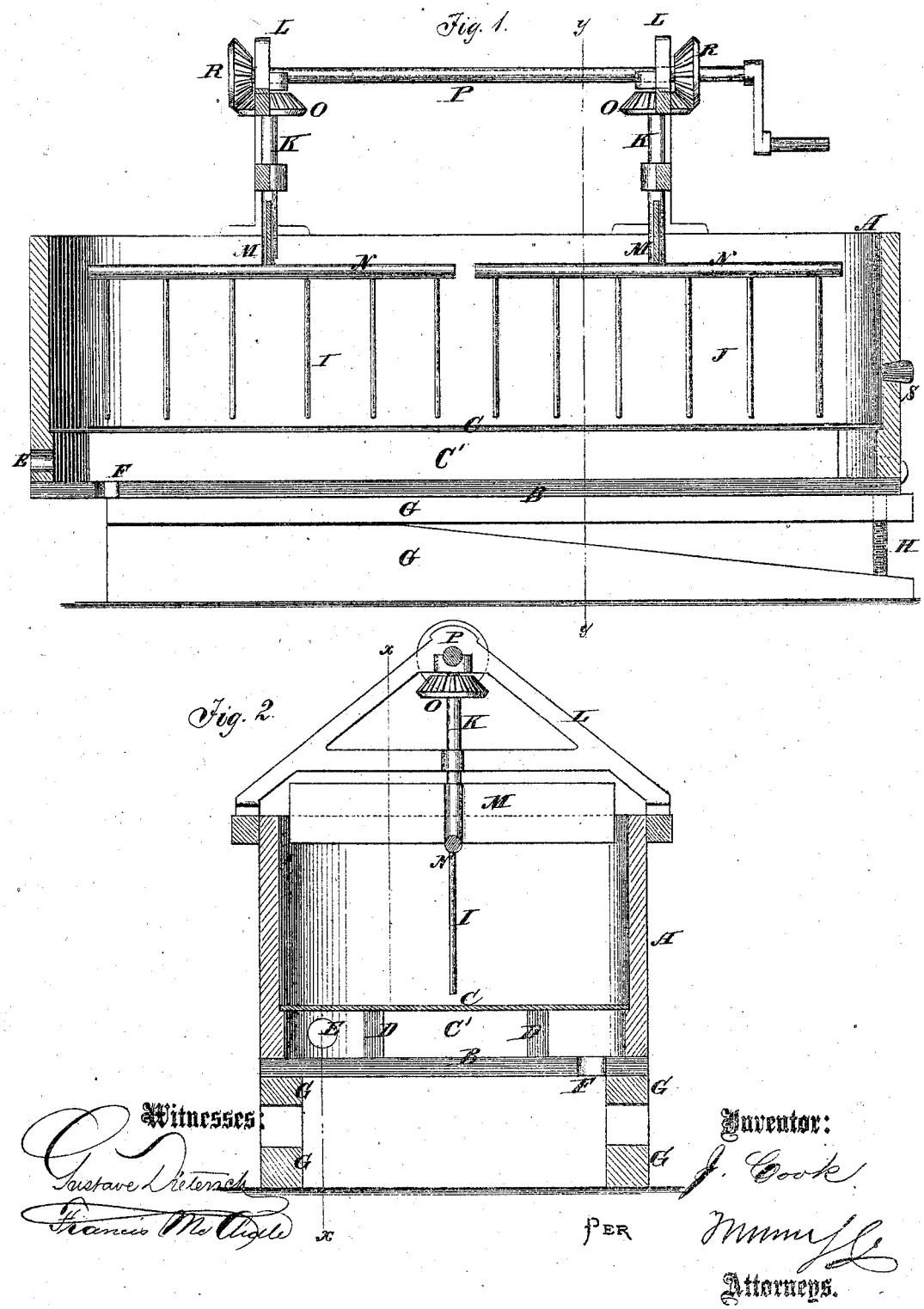

UNITED STATES PATENT OFFICE.

JUSTUS COOK, OF WELLSVILLE, NEW YORK.

IMPROVEMENT IN EVAPORATING APPARATUS.

Specification forming part of Letters Patent No. 120,859, dated November 14, 1871.

*To all whom it may concern:*

Be it known that I, JUSTUS COOK, of Wellsville, in the county of Allegany and State of New York, have invented a new and useful Improvement in Evaporating Apparatus; and I do hereby declare that the following is a full, clear, and exact description thereof, which will enable others skilled in the art to make and use the same, reference being had to the accompanying drawing forming part of this specification.

The object of this invention is to provide convenient and economical means for heating and evaporating liquids in the process of extracting the juices of plants, roots, barks, &c., as well as in the manufacture of sirups and sugar; and it consists in an evaporating vessel with a flat bottom and circular or square ends, and with a false flat bottom so placed as to leave a steam-space between the true and false bottoms, and in one or more rotating agitators or stirrers, the whole arranged and operating as hereinafter more fully set forth and described.

In the accompanying drawing, Figure 1 represents a vertical longitudinal section of the heater and evaporator on the line *x x* of Fig. 2, showing the construction and mode of operation. Fig. 2 is a vertical cross-section of Fig. 1 on the line *y y*.

Similar letters of reference indicate corresponding parts.

A is the vessel or tank, which may be made of any size and of any suitable material or materials. B is the true bottom, and C is the false bottom. C' is the space between these two bottoms, which is divided by partitions D D, by means of which the steam (which is introduced at E) is made to pass back and forth beneath the liquid in the vessel, and is finally discharged with the water of condensation at the point F. G G are timbers beneath the vessel, on each side, which are made adjustable by means of a joint connection and a screw, H, for each pair of timbers. By means of the screws the vessel may be brought to a true level and the liquid properly distributed therein or discharged therefrom. I and J are the agitators or stirrers, which are attached to the vertical shafts K K and suspended from the transverse trusses L L. The latter are supported by the sides of the vessel A, as seen in Fig. 2. When the evaporating vessel is full or nearly full the stirrers will revolve beneath the surface of the liquid and keep the liquid in a constant state of agitation. M M are sweep-plates attached to the vertical shafts, standing edgewise above the heads N of the agitators. These plates are designed to fan the surface of the liquid and blow off the steam to increase the evaporation. On each side of the vertical shafts there is a bevel-wheel, O. P is a horizontal shaft supported by the two trusses L L above the vessel, as seen in Fig. 1. R R are bevel-wheels on this shaft, which engage with the wheels O O.

Power being applied to the shaft P it will be seen that the agitators will be revolved with any required velocity.

As the heating agent employed for this evaporation is steam the vessel may be made of wood, and also the lower or true bottom. The false bottom is made of metal, on account of its being a better conductor of heat.

When heating or evaporation has been carried to the required extent the liquid is drawn off at the point S.

By this apparatus liquids of every description may be heated and vaporized in the most safe, perfect, and economical manner.

Having thus described my invention, I claim as new and desire to secure by Letters Patent—

1. The agitators I and J with the sweep-plates or fans M, in combination with an evaporating or heating vessel, arranged and operating as described.

2. The arrangement, in combination with a heater or evaporator, of the shaft P and gear-wheels O R, substantially as and for the purposes herein shown and described.

JUSTUS COOK.

Witnesses:
RICHARD D. PEARSON,
CYRENIUS CAMPBELL.

(155)